United States Patent
Yuan et al.

(10) Patent No.: US 9,973,330 B1
(45) Date of Patent: *May 15, 2018

(54) TRANSMITTER AND RECEIVER TRACKING TECHNIQUES FOR USER DEVICES IN A MIMO NETWORK

(71) Applicant: Google LLC, Mountain View, CA (US)

(72) Inventors: Yuan Yuan, Redwood City, CA (US); Carroll Gossett, Mountain View, CA (US)

(73) Assignee: Google LLC

( * ) Notice: Subject to any disclaimer, the term of this patent is extended or adjusted under 35 U.S.C. 154(b) by 0 days. days.

This patent is subject to a terminal disclaimer.

(21) Appl. No.: 15/412,234

(22) Filed: Jan. 23, 2017

Related U.S. Application Data

(63) Continuation of application No. 14/993,258, filed on Jan. 12, 2016, now Pat. No. 9,577,725, which is a continuation of application No. 13/913,608, filed on Jun. 10, 2013, now Pat. No. 9,271,171.

(51) Int. Cl.
  *H04J 3/00* (2006.01)
  *H04L 7/00* (2006.01)
  *H04B 7/0413* (2017.01)

(52) U.S. Cl.
  CPC ......... *H04L 7/0033* (2013.01); *H04B 7/0413* (2013.01)

(58) Field of Classification Search
  CPC ........ H04W 4/22; H04W 64/00; H04W 24/02
  See application file for complete search history.

(56) References Cited

U.S. PATENT DOCUMENTS

| | | | | |
|---|---|---|---|---|
| 5,542,119 A | * | 7/1996 | Grube | H04H 20/67 375/356 |
| 6,735,454 B1 | | 5/2004 | Yu et al. | |
| 6,765,531 B2 | * | 7/2004 | Anderson | G01S 5/02 342/378 |
| 2004/0198381 A1 | | 10/2004 | Siegel et al. | |
| 2005/0286424 A1 | * | 12/2005 | Peeters | H04B 3/462 370/235 |

(Continued)

OTHER PUBLICATIONS

Stuber et al., "Broadband MIMO-OFDM Wireless Communications", Proceedings of the IEEE, vol. 92 Issue: 2, pp. 271-294, Feb. 2004.

(Continued)

*Primary Examiner* — Yemane Mesfin
*Assistant Examiner* — Abdelillah Elmejjarmi
(74) *Attorney, Agent, or Firm* — Fish & Richardson P.C.

(57) ABSTRACT

A technique includes (i) receiving a first pilot signal from a base station via a receiver of a client device, or (ii) transmitting a second pilot signal from the client device to the base station via a transmitter of the client device. First time differences and signal quality values for N samples of N respective packets in the first pilot signal are determined. Second time differences and signal quality values are received via the receiver. The second time differences and signal quality values are generated for M samples of M respective packets in the second pilot signal. An offset value is determined based on (i) the first time differences and signal quality values, or (ii) the second time differences and signal quality values. Activation or deactivation times of the receiver or the transmitter or transmission times of the transmitter are adjusted based on the offset value.

19 Claims, 6 Drawing Sheets

(56) References Cited

U.S. PATENT DOCUMENTS

| | | | |
|---|---|---|---|
| 2007/0053340 A1* | 3/2007 | Guilford | G01S 5/10 370/350 |
| 2007/0253321 A1* | 11/2007 | Akita | H04B 7/022 370/208 |
| 2010/0232488 A1 | 9/2010 | Song et al. | |
| 2010/0296493 A1* | 11/2010 | Lee | H04B 1/7143 370/336 |
| 2011/0002232 A1 | 1/2011 | Niewczas et al. | |
| 2011/0103529 A1* | 5/2011 | Kim | H04B 10/60 375/344 |
| 2012/0140806 A1 | 6/2012 | Turner et al. | |
| 2012/0328061 A1* | 12/2012 | Chow | H04W 56/0015 375/354 |
| 2013/0115903 A1* | 5/2013 | Kroeger | H04B 7/0845 455/193.1 |

OTHER PUBLICATIONS

Tan et al.,"SAM: Enabling Practical Spatial Multiple Access in Wireless LAN", Proceedings of the 15th ann int'l conference on Mobile computing and networking, Sep. 20, 2009.

\* cited by examiner

TRANSMITTER AND RECEIVER TRACKING TECHNIQUES FOR USER DEVICES IN A MIMO NETWORK

CROSS-REFERENCE TO RELATED APPLICATIONS

This application is a continuation of U.S. application Ser. No. 14/993,258, filed Jan. 12, 2016, which is a continuation of U.S. application Ser. No. 13/913,608, filed Jun. 10, 2013, which are incorporated herein by reference.

FIELD

The present disclosure relates to multiple input multiple output (MIMO) networks, and more particularly to transmission and reception of timing of signals in a MIMO network.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A wireless MIMO network may include one or more base stations and numerous client devices, such as cellular phones, computers, notepads, tablets, personal data assistants and other mobile devices. In a wireless MIMO network, time division multiple access (TDMA) based medium access control is used. TDMA allows multiple client devices to share the same frequency channel by allocating respective time slots to each of the client devices. A base station may control time slot allocation of the client devices. Each of the client devices exchanges data with the base station in the time slots allocated for that client device.

Since the client devices are mobile and thus move between locations, distances between the base station and the client devices changes, as well as characteristics of transmission mediums between the base station and the client devices. The characteristics of the transmission mediums may include, for example, signal attenuation and interference. As a result, signal quality (or signal strength) can be negatively affected due to propagation advances and/or delays of signals transmitted between the base station and the client devices.

SUMMARY

A computer-implemented technique of tuning at least one of a receiver and a transmitter of a client device is provided. The technique includes at least one of (i) receiving a first pilot signal from a base station via the receiver of the client device, and (ii) transmitting a second pilot signal from the client device to the base station via the transmitter of the client device. The technique may include determining, via one of a physical layer device (PHY) and a medium access controller (MAC) of the client device, first time differences and first signal quality values for N samples of N respective packets in the first pilot signal, where N is an integer greater than 1. The technique may include receiving second time differences and second signal quality values from the base station via the receiver of the client device. The second time differences and second signal quality values are generated for M samples of M respective packets in the second pilot signal at the base station, where M is an integer greater than 1.

The technique further includes comparing each of the first time differences or the second time differences to a preselected amount of time in one of the PHY and the MAC. For each of the first time differences or the second time differences that is less than or equal to the preselected amount of time, a complex number is generated based on (i) the corresponding first time difference or second time difference, and (ii) one of the first signal quality values and second signal quality values. The complex numbers are weighted with respective ones of the first signal quality values or second signal quality values. An offset value is determined based on the weighted complex numbers via one of the PHY and the MAC. The technique further includes adjusting, via the PHY and based on the offset value, at least one of (i) an activation time or a deactivation time of the receiver of the client device, and (ii) a transmission time, an activation time or a deactivation time of the transmitter of the client device.

In other features, a computer-implemented technique is provided for tuning at least one of a receiver and a transmitter of a client device. The technique includes at least one of (i) receiving a first pilot signal from a base station via the receiver of the client device, and (ii) transmitting a second pilot signal from the client device to the base station via the transmitter of the client device. The technique may include determining, via one of a PHY and a MAC of the client device, first time differences and first signal quality values for N samples of N respective packets in the first pilot signal, where N is an integer greater than 1.

The technique may further include receiving second time differences and second signal quality values from the base station via the receiver of the client device. The second time differences and second signal quality values are generated for M samples of M respective packets in the second pilot signal at the base station, where M is an integer greater than 1. An offset value is determined, via one of the PHY and the MAC, based on (i) the first time differences and the first signal quality values, or (ii) the second time differences and the second signal quality values. The technique further includes adjusting, via the PHY and based on the offset value, at least one of (i) an activation time or a deactivation time of the receiver of the client device, and (ii) a transmission time, an activation time or a deactivation time of the transmitter of the client device.

In other features, a computer-implemented technique of tuning at least one of a receiver and a transmitter of a client device is provided. The technique includes receiving a pilot signal from the client device via a receiver of a base station. The pilot signal is sampled to determine receive times for N samples of N respective packets in the pilot signal via the receiver of the base station, where N is an integer greater than 1. The technique further includes determining, via one of a physical layer device (PHY) and a medium access controller (MAC), parameters including (i) time differences between the receive times and respective predetermined allocation times for each of the N samples, and (ii) determining a signal quality value for each of the N samples using one of the PHY and the MAC. The signal quality values are determined signal strengths of the pilot signal. The parameters are transmitted to the client device to adjust at least one of (i) activation times or deactivation times of a receiver of the client device, and (ii) transmission times, activation times or deactivation times of the transmitter of the client device.

In other features, a computer-implemented method of tuning a receiver of a client device is provided. The method includes receiving a pilot signal from a base station via the receiver of the client device. Time differences and signal quality values are determined, via one of a physical layer device (PHY) and a medium access controller (MAC) of the client device, for N samples of N respective packets in the pilot signal, where N is an integer greater than 1. An offset value is determined, via one of the PHY and the MAC, based on the time differences and the signal quality values. The method further includes adjusting, via the PHY and based on the offset value, an activation time or a deactivation time of the receiver of the client device.

In other features, a computer-implemented method of tuning a transmitter of a client device is provided. The method includes transmitting a pilot signal from the client device to a base station via the transmitter of the client device. Time differences and signal quality values are received from the base station via the receiver of the client device. The time differences and signal quality values are generated for M samples of M respective packets in the pilot signal at the base station, where M is an integer greater than 1. An offset value is determined, via one of the PHY and the MAC, based on the time differences and the signal quality values. The method further includes adjusting, via the PHY and based on the offset value, at least one of a transmission time, an activation time or a deactivation time of the transmitter of the client device.

In other features, a computer-implemented method of tuning a receiver of a client device is provided. The method includes receiving a pilot signal from the client device via a receiver of a base station. The pilot signal is sampled to determine receive times for N samples of N respective packets in the pilot signal via the receiver of the base station, where N is an integer greater than 1. The method further includes determining, via one of a physical layer device (PHY) and a medium access controller (MAC), parameters including: (i) time differences between the receive times and respective predetermined allocation times for each of the N samples; and (ii) determining a signal quality value for each of the N samples using one of the PHY and the MAC. The signal quality values are determined signal strengths of the pilot signal. The parameters are transmitted to the client device to adjust activation times or deactivation times of the receiver of the client device.

In other features, a computer-implemented method of tuning a transmitter of a client device is provided. The method includes receiving a pilot signal from the client device via a receiver of a base station. The pilot signal is sampled to determine receive times for N samples of N respective packets in the pilot signal via the receiver of the base station, where N is an integer greater than 1. The method further includes determining, via one of a physical layer device (PHY) and a medium access controller (MAC), parameters including: (i) time differences between the receive times and respective predetermined allocation times for each of the N samples; and (ii) determining a signal quality value for each of the N samples using one of the PHY and the MAC. The signal quality values are determined signal strengths of the pilot signal. The parameters are transmitted to the client device to adjust transmission times, activation times or deactivation times of the transmitter of the client device.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1:
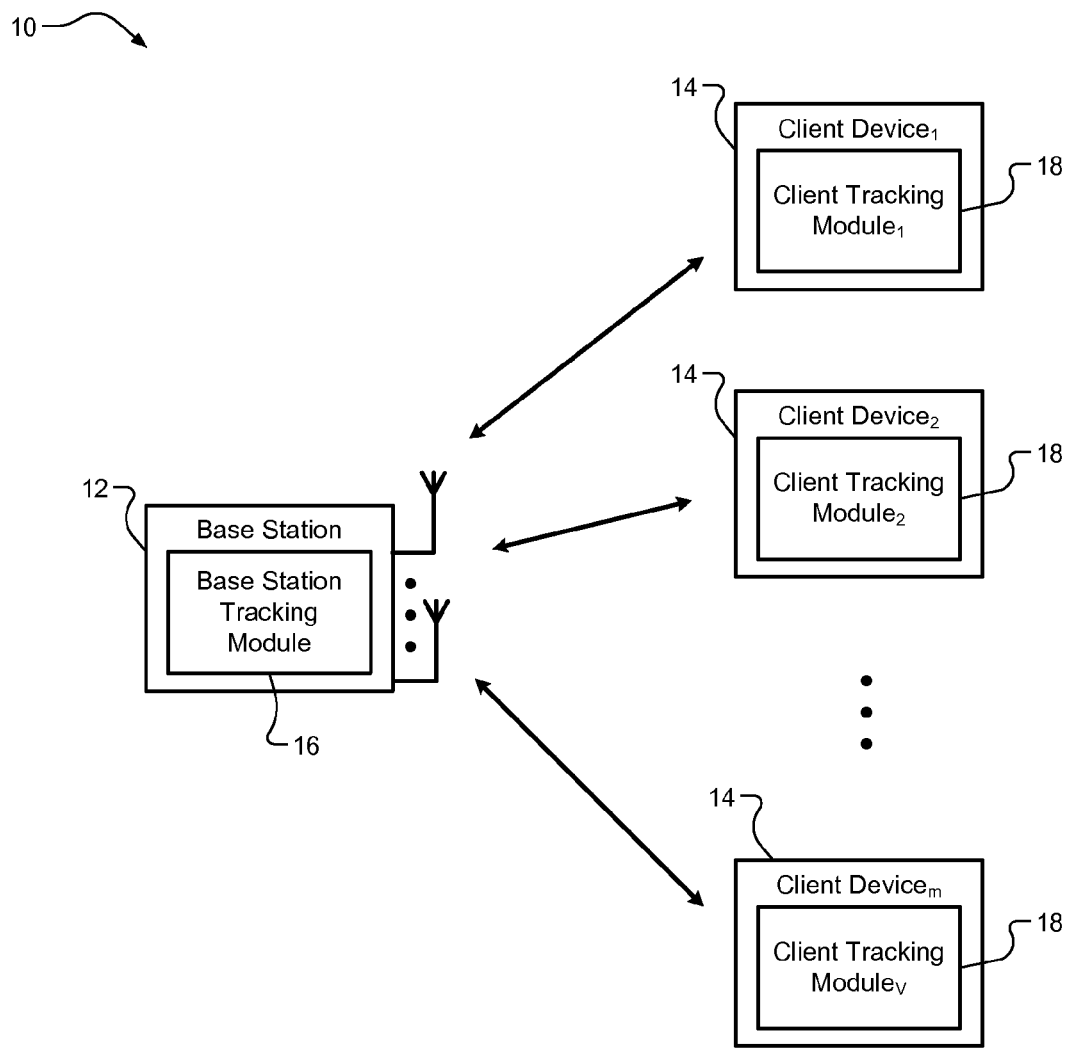
FIG. 1 is a functional block diagram of a wireless MIMO network in accordance with the present disclosure.
Figure 2:
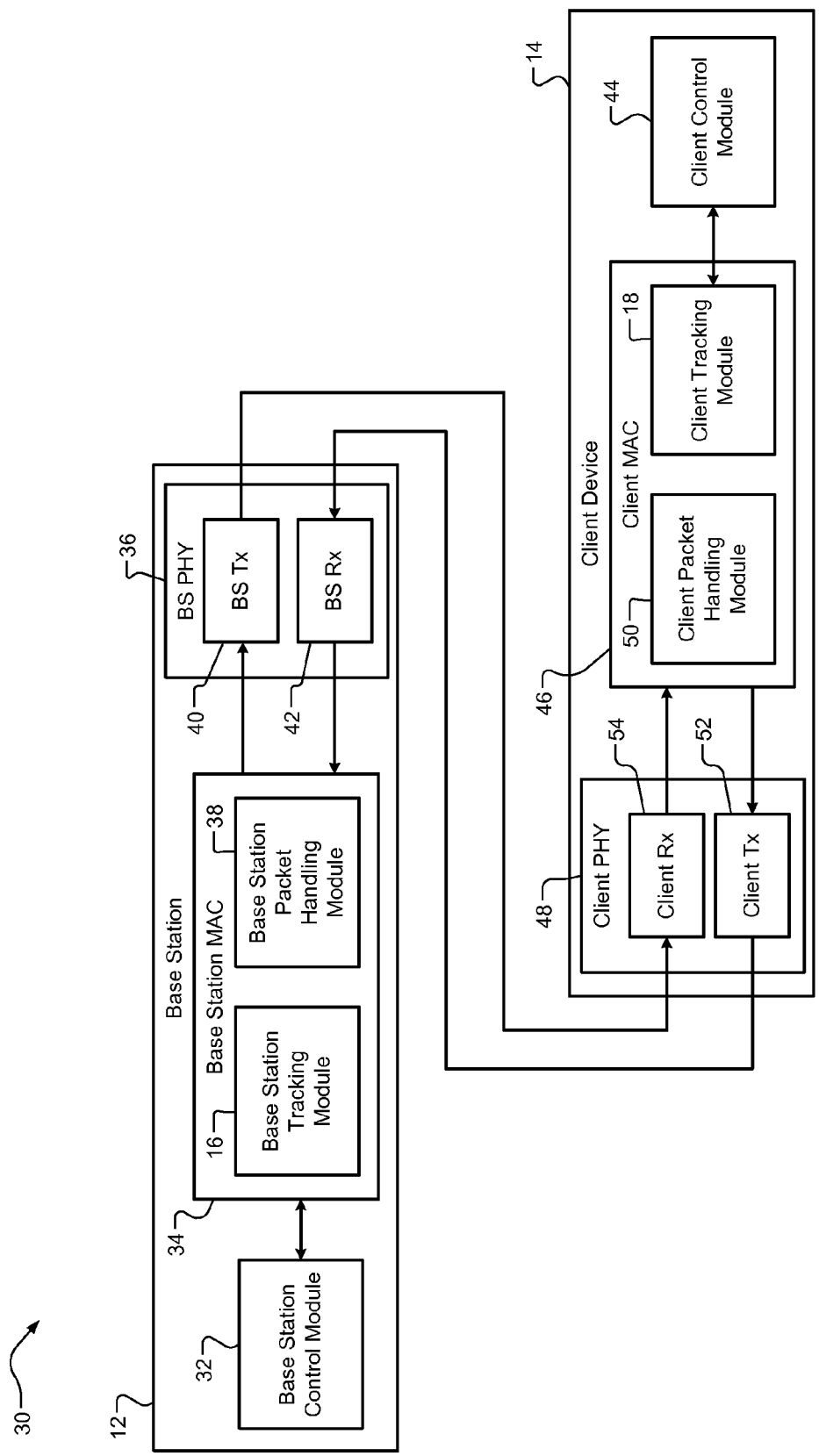
FIG. 2 is a functional block diagram of a portion of the wireless MIMO network of FIG. 1.

In FIG. 1, a functional block diagram of a wireless MIMO network 10 is shown. The wireless MIMO network 10 includes one or more base stations (one base station 12 is shown) and multiple client devices 14. The base station 12 and the client devices 14 operate to adjust activation and deactivation times of receivers and transmitters of the client devices 14. This includes adjusting reception and transmission timing of the client devices 14. Examples of receivers and transmitters of a client device are shown in FIG. 2.

The base station 12 and the client devices 14 operate to adjust activation and deactivation timing of the receivers of the client devices 14, transmission timing of the transmitters of the client devices 14, and activation and deactivation timing of the transmitters of the client devices 14. As an example, when a client device moves away from a base station, a propagation delay may be introduced and/or the transmission medium between the client device and the base station may change. To compensate for the propagation delay, transmission times and reception times of the client device may be adjusted. For example, the transmitter of the client device may transmit earlier to account for the introduced propagation delay such that the transmitted signal arrives at the base station at an appropriate time. Activation of the receiver of the client device may be delayed to account for the increased time for a signal to be transmitted from the base station to the client device. This prevents the receiver from being activated too early and conserves power by minimizing the amount of time the receiver is activated.

Transmitter and receiver timing of the client devices 14 are adjusted for compound signals transmitted from the client devices 14 to the base station 12 and transmitted from the base station 12 to the client devices 14. The compound signals may be time division multiple access (TDMA) signals. Each of the compound signals may include a data signal (e.g., user data signal) and a pilot (or reference) signal. The compound signals may also be transmitted between the base station 12 and the client devices 14 in television (TV) whitespace at, for example, 600-800 MHz or at other whitespace or signal transmission frequencies and/or frequency ranges. The other signal transmission frequency ranges may be suitable for transmission of TDMA signals in a MIMO network between a base station and client devices.

The base station 12 and each of the client devices 14 may be spread spectrum devices that transmit signals to each other using one or more antennas and receive via respective wideband receivers. The base station 12 may transmit using multiple antennas to communicate with one or more of the client devices 14 at the same time. Each of the client devices 14 may communicate using one or more antennas. Signals transmitted between the base station 12 and the client devices 14 may be transmitted over available TV whitespace frequencies (or available TDMA frequencies), which is referred to as a channel. The channel may include all available and/or selected TV whitespace frequencies unused by TV broadcast providers. The base station 12 and each of the client devices 14 may communicate with each other via the channel using all or a subset of the frequencies assigned to the channel. The same data (or content) may not be transmitted over each of the assigned frequencies, but rather may be spread across the assigned frequencies and transmitted from the base station 12 and received by each of the client devices 14. Each of the client devices 14 may transmit data over the assigned frequencies to the base station 12.

The base station (BS) 12 includes a BS tracking module 16 that divides transmission time allocated to the client devices 14 into frames. Each of the frames may have, for example, 32 slots. Each of the slots may have, for example, 64 symbols. Each of the symbols may have a symbol period of, for example, 17 microseconds. Half of the symbols (or 32 of the 64 symbols) are used for uplink signals transmitted from the client devices to the base station. The other half of the symbols (other 32 of the 64 symbols) are used for downlink signals transmitted from the BS 12 to the client devices 14.

To maintain each of the client devices in a "client active" state, two symbols (identified as static symbols) may be allocated for each of the client devices 14. The first static symbol is used for uplink transmissions. The second static symbol is used for downlink transmission. This allows each of the client devices 14 to access a channel shared by the client devices 14 at least once per frame.

The BS tracking module 16 tracks compound signals transmitted from each of the client devices 14 to the BS 12 to determine parameters associated with these compound signals. The BS tracking module 16 may also track parameters associated with compound signals transmitted from the BS 12 to the client devices 14. The parameters of the compound signals transmitted between the BS 12 and the client devices 14 may include, for example, arrival times, time differences, and signal quality values. The arrival times are times that compound signals are received and sampled at the BS 12 and/or at the client devices 14. The time differences are differences between the arrival times and respective allocated times of the client devices 14 and/or differences between the arrival times and one or more previous adjustment time(s). These and other parameters are tracked by the BS tracking module 16 and described in further detail below.

The BS tracking module 16 may perform client receiver and/or client transmitter tuning based on the parameters. This may include transmitting a pilot signal, a parameters signal, a control signal or other signal(s) to the client devices 14 and/or receiving a pilot signal and/or parameters from the client devices 14. The pilot signals may be transmitted at carrier frequencies and modulated with the respective data signals. The pilot signals may be used as reference signals by the BS 12 to determine any of the parameters disclosed herein.

The client devices 14 may be mobile devices or stationary devices. Each of the client devices 14 includes a client tracking module 18. Each of the client tracking modules 18 monitors compound signals transmitted from the BS 12 to a respective one of the client devices 14 to determine parameters associated with these compound signals. The parameters may include, for example, the arrival times, time differences, and signal quality values mentioned above and/or other parameters described below. Each of the client tracking modules 18 may perform client receiver tuning based on pilot signals, parameter signals, timing signals, and/or other signals received from the BS 12.

The networks disclosed herein may each be identified as a system. For example, the wireless MIMO network 10 may be identified respectively as a wireless MIMO system.

In FIG. 2, a portion 30 of the wireless MIMO network 10 is shown. The portion 30 includes the BS 12 and one of the client devices 14. The BS 12 includes a BS control module 32, a medium access controller (MAC) 34 and a physical layer device (PHY) 36. The BS control module 32 may generate packets in the form of data signals (e.g., user data signals) to be transmitted to the client device 14 and receive other data signals from the client device 14 via the BS MAC 34 and BS PHY 36. The BS MAC 34 may include the BS tracking module 16 and a BS packet handling module 38. The BS tracking module 16 may generate BS pilot signals to be combined with data signals and transmitted as compound signals to the client device 14. The BS tracking module 16 may also track parameters disclosed herein and perform client receiver and/or transmitter tuning as disclosed below.

The BS packet handling module 38 may perform signal conditioning, prepare packets for transmission on a medium or over a medium and/or network between the BS 12 and the client device 14, and/or prepare packets received from the client device 14 for the BS tracking module 16. The BS PHY 36 may include hardware, such as a BS transmitter 40 and a BS receiver 42.

The client device 14 includes a client control module 44, a client MAC 46 and a client PHY 48. The client control module 44 may generate packets in the form of data signals to be transmitted to the client device 14 and receive other data signals from the client device 14 via the client MAC 46 and client PHY 48. The client MAC 46 may include the client tracking module 18 and a client packet handling module 50. The client tracking module 18 may generate client pilot signals to be combined with data signals and transmitted as compound signals to the BS 12. The client tracking module 18 may also track parameters disclosed herein and perform client receiver and transmitter tuning as disclosed below.

The client packet handling module 50 may perform signal conditioning, prepare packets for transmission on the medium or over a network between the BS 12 and the client device 14, and/or prepare packets received from the base station for the client tracking module 18. The client PHY 48 may include hardware, such as a client transmitter 52 and a client receiver 54.

Although the BS tracking module 16 is shown in the BS MAC 34, the BS tracking module 16 and/or one or more module(s) of the BS tracking module 16 may alternatively be included in the BS PHY 36. Similarly, although the client tracking module 18 is shown in the client MAC 46, the client tracking module 18 and/or one or more module(s) of the client tracking module 18 may alternatively be included in the client PHY 48.

Figure 3:
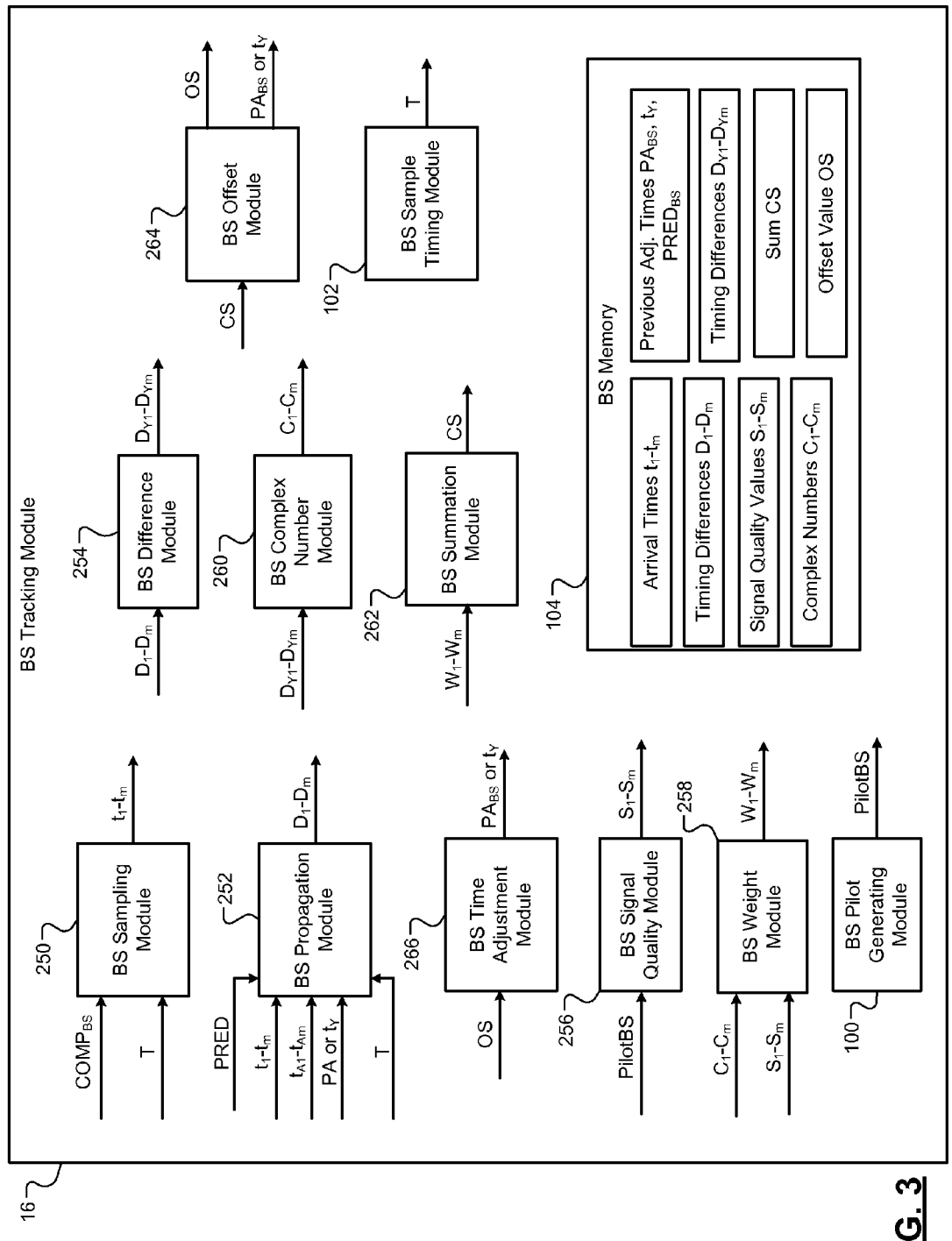
FIG. 3 is a functional block diagram of a base station tracking module in accordance with the present disclosure.
Figure 4:
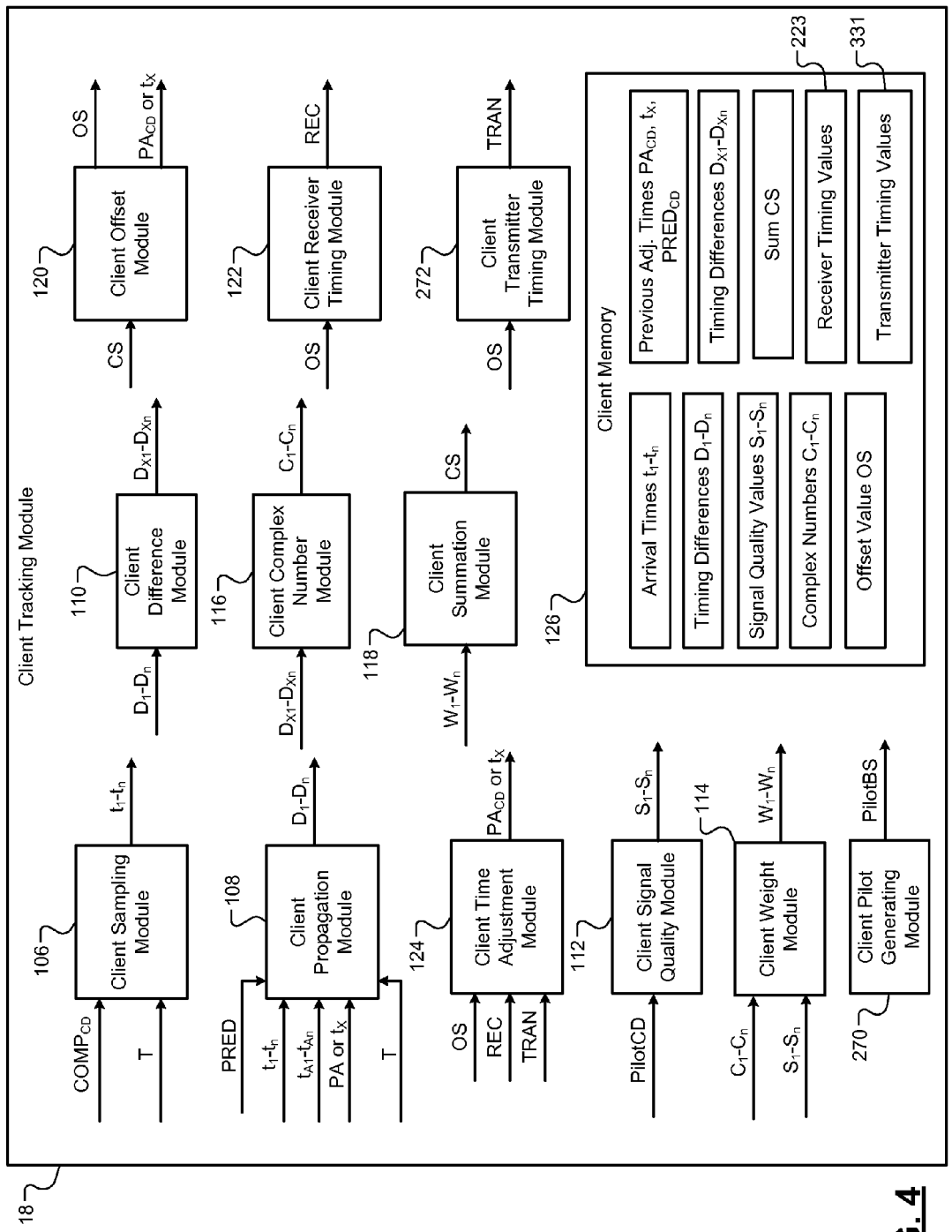
FIG. 4 is a functional block diagram of a client tracking module in accordance with the present disclosure.

Referring now also to FIGS. 3-4, the BS tracking module 16 and the client tracking module 18 are shown. The BS tracking module 16 may include a BS pilot generating module 100, a BS sample timing module 102, and a BS memory 104. The client tracking module 18 may include a client sampling module 106, a client propagation module 108, a client difference module 110, a client signal quality module 112, a client weight module 114, a client complex number module 116, a client summation module 118, an client offset module 120, a client receiver timing module 122, a client time adjustment module 124, and a client memory 126.

Although the BS memory 104 is shown as being included in the BS tracking module 16, the BS memory 104 may be included in the BS control module 32, the BS MAC 34, and/or the BS PHY 36. The BS memory 104 may be separate from the BS 12, the BS tracking module 16, the BS control module 32, the BS MAC 34 and/or the BS PHY 36 and accessed accordingly. Also, although the client memory 126 is shown as being included in the client tracking module 18, the client memory 126 may be included in the client control module 44, the client MAC 46, and/or the client PHY 48. The client memory 126 may be separate from the client device 14, the client tracking module 18, the client control module 44, the client MAC 46 and/or the client PHY 48 and accessed accordingly.

Figure 5:
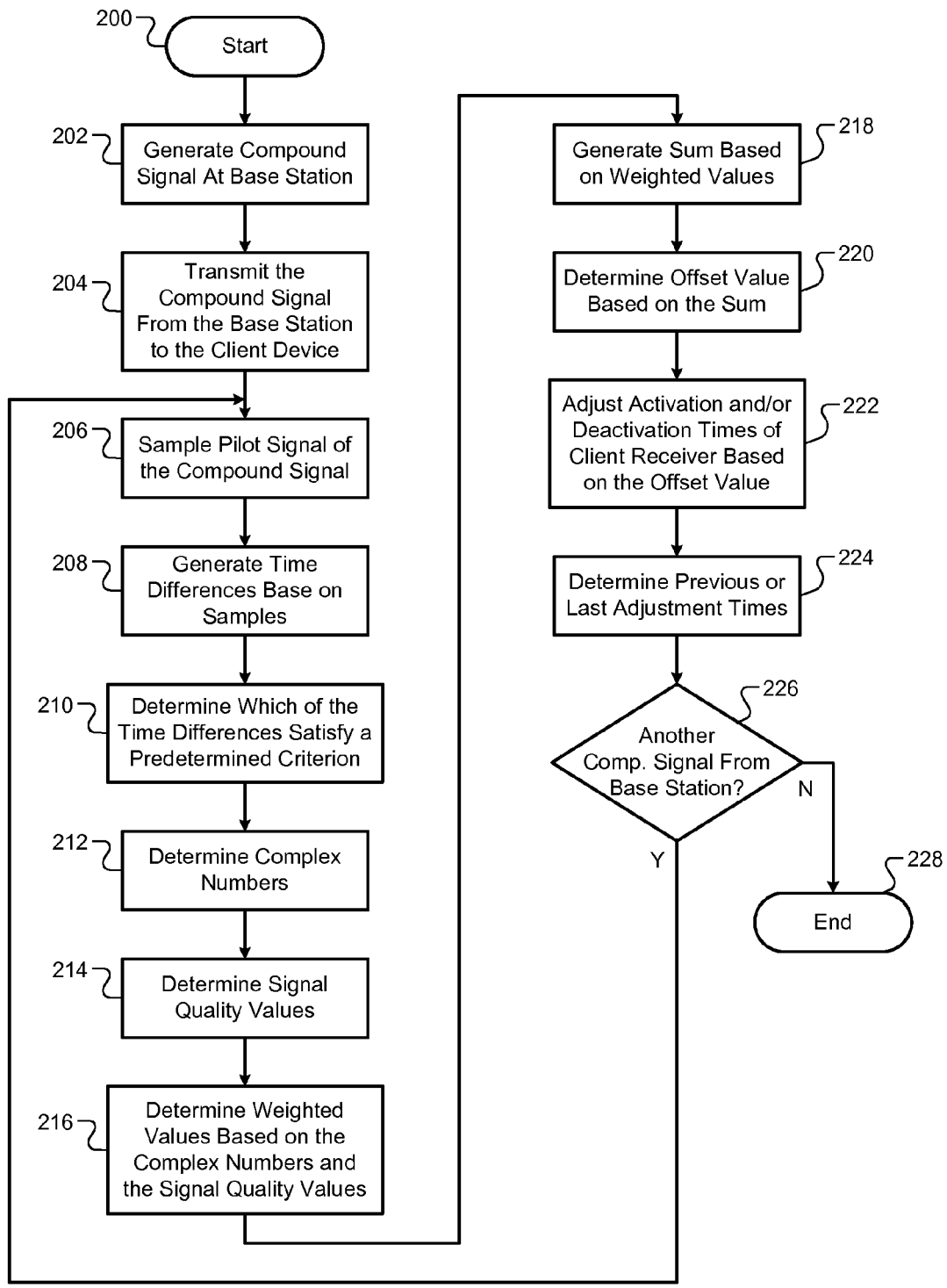
FIG. 5 is a flow chart of a signal timing technique including client receiver tuning in accordance with the present disclosure.
Figure 6:
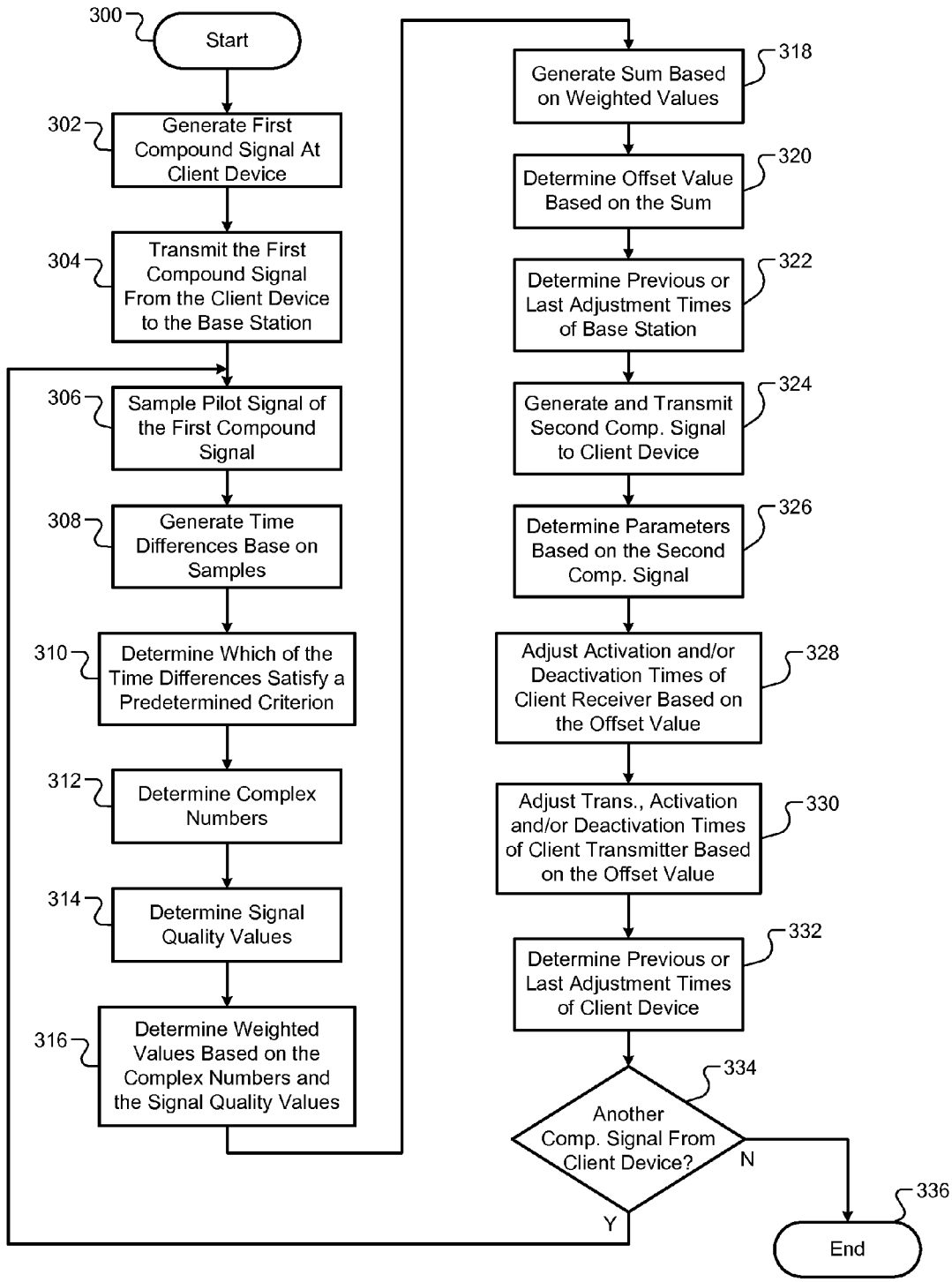
FIG. 6 is a flow chart of a signal timing technique including client receiver and transmitter tuning in accordance with the present disclosure.

The above-described wireless MIMO network 10 may be operated using numerous techniques, example techniques (or computer-implemented methods or algorithms) are provided in FIGS. 5 and 6. In FIG. 5, a signal timing technique including client receiver tuning is shown. Although the following tasks are primarily described with respect to the implementations of FIGS. 1-4, the tasks may be easily modified to apply to other implementations of the present disclosure. The tasks may be iteratively performed. Any of the values used and/or determined in the following tasks may be stored in the client memory 126 and/or accessed by any of the modules and devices of the client device 14. The technique may begin at 200.

At 202, the BS 12 may generate a compound signal $COMP_{BS}$ including a data signal and a pilot signal PilotBS with corresponding packets via the BS tracking module 16, the BS control module 32 and the BS pilot generating module 100. The BS tracking module 16 may combine the data signal and the pilot signal PilotBS to form the compound signal $COMP_{BS}$. At 204, the compound signal $COMP_{BS}$ is transmitted from the BS 12 to the client device 14.

At 206, the client sampling module 106, the client MAC 46 and/or the client PHY 48 may receive and sample the compound signal $COMP_{BS}$ to generate a sample at each of times $t_1$-$t_n$ (referred to as arrival or receive times $t_1$-$t_n$), where n is the total number of samples (i.e. signals or packets). The client sampling module 106, the client MAC 46 and/or the client PHY 48 may sample the compound signal $COMP_{BS}$ based on a preselected amount of time T. The preselected amount of time T may be equal to a period of a frame (e.g., 40 milliseconds (ms)). The preselected amount of time T may be set by, for example, the BS sample timing module 102 and transmitted to the client device 14. The preselected amount of time T may be included in the pilot signal PilotBS and/or stored in the client memory 126.

At 208, the client propagation module 108, the client MAC 46 and/or the client PHY 48 compares the sample times $t_1$-$t_n$ to predetermined or allocated times $t_{A1}$-$t_{An}$ to generate time differences $D_1$-$D_n$, where n is the number of arrival times or samples. The allocated times $t_{A1}$-$t_{An}$ are times allocated to the client device 14 by the BS 12 for uplink and downlink of signals between the client device 14 and the BS 12. The client propagation module 108 may store or have access to a reference pilot signal and compare the reference pilot signal to the pilot signal PilotBS to determine the time differences $D_1$-$D_n$. The time differences $D_1$-$D_n$ may be equal to or based on differences (i) between the sample times $t_1$-$t_n$ and a predetermined time $PRED_{CD}$ and/or (ii) between the sample times $t_1$-$t_n$ and respective ones of allocated times $t_{A1}$-$t_{An}$. The predetermined time $PRED_{CD}$ may be provided to compare each of the sample times $t_1$-$t_n$ to the same predetermined or reference time. The allocated times $t_{A1}$-$t_{An}$ may be stored in the client memory 126 and/or received from the BS 12, for example, in the data signal or pilot signal PilotBS.

The time differences $D_1$-$D_n$ may alternatively be equal to or based on differences (i) between each of the sample times $t_1$-$t_n$ and a previous adjustment time $PA_{CD}$ or (ii) between each of the sample times $t_1$-$t_n$ and a respective one of the last adjustment times $t_1$-$t_X$, where X is an integer that may be equal to the number of samples n. The previous adjustment time $PA_{CD}$ identifies a time when an offset value $OS_{CD}$ was most recently determined by the client offset module 120 and/or a time when receiver activation or deactivation timing was adjusted based on the offset value $OS_{CD}$. Each of the last adjustment times $t_1$-$t_X$ may: be equal to the previous adjustment time $PA_{CD}$; identify a time when the offset value $OS_{CD}$ was most recently determined relative to a corresponding one of the sample times $t_1$-$t_n$; and/or identify a last time when receiver activation or deactivation timing was adjusted based on the offset value OS relative to one of the sample times $t_1$-$t_n$. Other example offset values are provided below on which the last adjustment times $t_1$-$t_X$ may be determined.

At 210, the client difference module 110, the client MAC 46 and/or the client PHY 48 may determine which of the time differences $D_1$-$D_n$ for each of the samples satisfy a predetermined criterion. For example, the client difference module 110, the client MAC 46 and/or the client PHY 48 may determine which of the time differences $D_1$-$D_n$ are less than or equal to the preselected amount of time T, which is defined above. The client difference module 110, the client MAC 46 and/or the client PHY 48 may determine whether a current sample time t (one of the sample times $t_1$-$t_n$) satisfies one or more of equations 1-3.

$$t_X - t \leq T \quad (1)$$

$$PA_{CD} - t \leq T \quad (2)$$

$$PRED_{CD} - t \leq T \quad (3)$$

The time differences $D_1$-$D_n$ that satisfy equation 1 are represented as time differences $D_{X1}$-$D_{Xn}$. The time differences $D_{X1}$-$D_{Xn}$ are a subset of the time differences $D_1$-$D_n$.

At 212, the client complex number module 116, the client MAC 46 and/or the client PHY 48 determines complex numbers $C_1$-$C_n$ based on the time differences $D_{X1}$-$D_{Xn}$. The complex numbers $C_1$-$C_n$ may be represented by equation 4, where i is equal to $\sqrt{-1}$, and each one of the complex numbers $C_1$-$C_n$ has a real part (e.g., $\cos(D_{X1})$) and an imaginary part (e.g., $i \cdot \sin(D_{X1})$).

$$C_1, \ldots, C_n = \cos(D_{X1}) + i \cdot \sin(D_{X1}), \ldots, \cos(D_{Xn}) + i \cdot \sin(D_{Xn}) \quad (4)$$

At 214, the client signal quality module 112, the client MAC 46 and/or the client PHY 48 determines signal strengths (or quality) values $S_1$-$S_n$ (referred to as weights) based on the pilot signal PilotBS. The signal quality values $S_1$-$S_n$ may be magnitudes that are equal to, proportional to, or determined as a function of signal-to-noise ratios (SNRs) (or signal-to-interference ratios (SIRs)) and a reduced bit error rates (BERs), or other signal quality characteristics of the pilot signal PilotBS. The client signal quality module 112, the client MAC 46 and/or the client PHY 48 may determine the signal quality characteristics.

At 216, the client weight module 114, the client MAC 46 and/or the client PHY 48 determines weighted values $W_1$-$W_n$ based on the complex numbers $C_1$-$C_n$ and the signal quality values $S_1$-$S_n$. The weighted values $W_1$-$W_n$ may be represented by equation 5 and/or 6.

$$W_1, \ldots, W_n = S_1 C_1, \ldots, S_n C_n \qquad (5)$$

$$W_1, \ldots, W_n = S_1[\cos(D_{X1}) + i \cdot \sin(D_{X1})], \ldots, S_n[\cos(D_{Xn}) + i \cdot \sin(D_{Xn})] \qquad (6)$$

Samples with a larger (or better) signal quality value may be weighted more (larger weight value) than samples with a smaller signal quality value.

At 218, the client summation module 118, the client MAC 46 and/or the client PHY 48 determines a sum CS based on the weighted values $W_1$-$W_n$. The sum CS may be represented by equation 7 and/or 8.

$$CS = W_1 + W_2 + \ldots + W_n \qquad (7)$$

$$CS = S_1[\cos(D_{X1}) + i \cdot \sin(D_{X1})] + \ldots + S_n[\cos(D_{Xn}) + i \cdot \sin(D_{Xn})] \qquad (8)$$

When using equations 7 and 8, the cosine terms of the complex numbers may be summed to provide a cosine sum and the sine terms of the complex numbers may be summed to provide a sine sum. The sum CS may be equal to a sum of the cosine sum and the sine sum.

At 220, the client offset module 120, the client MAC 46 and/or the client PHY 48 determines a propagation advance period or a propagation delay period, which may be equal to the offset value $OS_{CD}$. The offset value $OS_{CD}$ may be determined using equation 9, where K is a constant, which may be a predetermined value and/or set by a control module of the client device 14.

$$OS_{CD} = K \cdot \arg(CS) \qquad (9)$$

When using equation 9, the client offset module 120, the client MAC 46 and/or the client PHY 48 sets the offset value $OS_{CD}$ equal to the constant K multiplied by an argument of the sum CS.

At 222, the client receiver timing module 122, the client MAC 46 and/or the client PHY 48 may generate a receiver signal REC to adjust activation times and/or deactivation times of the client receiver 54 based on the offset value $OS_{CD}$ and/or one of the other parameters used to determine the offset value $OS_{CD}$. The receiver signal REC may indicate the activation and/or deactivation times as receiver timing values 223. The activation and/or deactivation times of the client receiver 54 may be delayed or advanced from current activation and/or deactivation times by an amount of the offset value $OS_{CD}$. This delays or advances periods and/or changes durations of the periods when the client receiver 54 is receiving signals from the BS 12. The receiver signal REC may be received by the client receiver 54, the client PHY 48, and/or a control module controlling power to the client receiver 54. The control module may be, for example, the client control module 44, a control module in the client MAC 46, the client PHY 48, or client receiver 54, or another control module.

At 224, the client time adjustment module 124, the client MAC 46 and/or the client PHY 48 determines the previous adjustment time PA or one of the last adjustment times $t_1$-$t_X$. The client time adjustment module 124, the client MAC 46 and/or the client PHY 48 may determine the times PA, $t_1$-$t_X$ based on the offset value $OS_{CD}$, the receive signal REC, and/or times when the offset value $OS_{CD}$ and/or the receive signal REC were last updated. The times PA, $t_1$-$t_X$ may be set equal to a time when the offset signal $OS_{CD}$ and/or the receive signal REC were last updated. Each of the last adjustment times $t_1$-$t_X$ may be set equal to a time when the offset value $OS_{CD}$ or the receive signal REC was last updated relative to a corresponding sample time $t_1$-$t_n$. This provides updated last adjustment times which may be used when determining subsequent time differences.

As described, the activation and/or deactivation timing of the client receiver 54 is adjusted based on and/or as a function of various parameters, such as the time differences $D_1$-$D_n$, the time differences $D_{X1}$-$D_{Xn}$, the complex numbers $C_1$-$C_n$, the signal quality values $S_1$-$S_n$, the weighted values $W_1$-$W_n$, the sum CS and the offset value $OS_{CD}$. This activation and deactivation timing adjustment may be performed by the client receiver 54 and/or client PHY 48, for example, during each frame, periodically, randomly, and/or every predetermined number of frames. The activation and deactivation timing adjustment delays or advances periods when the client receiver is turned ON (active) and is receiving signals from the BS 12.

At 226, the client MAC 46 and/or the client PHY 48 may determine whether another signal (e.g., compound signal) is received from the BS 12. The method may end at 228 or return to task 206 when another signal is received, as shown.

Referring now to FIGS. 3, 4 and 6, another signal timing technique including client receiver and transmitter tuning is shown. The BS tracking module 16 may further include a BS sampling module 250, a BS propagation module 252, a BS difference module 254, a BS signal quality module 256, a BS weight module 258, a BS complex number module 260, a BS summation module 262, a BS offset module 264, and a BS time adjustment module 266. The client tracking module 18 may further include a client pilot generating module 270 and a client transmitter timing module 272.

Although the following tasks are primarily described with respect to the implementations of FIGS. 1-4, the tasks may be easily modified to apply to other implementations of the present disclosure. The tasks may be iteratively performed. Any of the values used and/or determined in the following tasks may be stored in the memories 104, 126 and/or accessed by any of the modules and devices of the BS 12 and/or client device 14. The technique may begin at 300.

At 302, the client device 14 may generate a compound signal $COMP_{CD}$ including a data signal and a pilot signal PilotCD with corresponding packets via the client tracking module 18, client control module 44 and the client pilot generating module 270. The client tracking module 18 may combine the data signal and the pilot signal PilotCD to form the compound signal $COMP_{CD}$. At 304, the compound signal $COMP_{CD}$ is transmitted from the client device 14 to the BS 12.

At 306, the BS sampling module 250, the BS MAC 34 and/or the BS PHY 36 may receive and sample the compound signal $COMP_{CD}$ to generate a sample at each of times $t_1$-$t_m$ (referred to as arrival or receive times $t_1$-$t_m$), where m is the total number of samples (i.e. signals or packets). The BS sampling module 250, the BS MAC 34 and/or the BS PHY 36 may sample the compound signal $COMP_{CD}$ based on the preselected amount of time T, which is defined above.

The preselected amount of time T may be set by, for example, the BS sample timing module 102. The preselected amount of time T may be stored in the BS memory 104.

At 308, the BS propagation module 252, the BS MAC 34 and/or the BS PHY 36 compares the sample times $t_1$-$t_m$ to predetermined or allocated times $t_{A1}$-$t_{Am}$ to generate time differences $D_1$-$D_m$, where m is the number of arrival times or samples. The client propagation module 108 may store or have access to a reference pilot signal and compare the reference pilot signal to the pilot signal PilotBS to determine the time differences $D_1$-$D_n$. The time differences $D_1$-$D_m$ may be equal to or based on differences (i) between the sample times $t_1$-$t_m$ and a predetermined time $PRED_{BS}$ and/or (ii) between the sample times $t_1$-$t_m$ and respective ones of allocated times $t_{A1}$-$t_{Am}$. The predetermined time $PRED_{BS}$ may be provided to compare each of the sample times $t_1$-$t_m$ to the same predetermined or reference time. The allocated times $t_A$-$t_{Am}$ may be stored in the BS memory 104. The allocated times $t_A$-$t_{Am}$ are times allocated to the client device 14 by the BS 12 for uplink and downlink of signals between the client device 14 and the BS 12.

The time differences $D_1$-$D_m$ may alternatively be equal to or based on differences (i) between each of the sample times $t_1$-$t_m$ and a previous adjustment time $PA_{BS}$ or (ii) between each of the sample times $t_1$-$t_m$ and a respective one of last adjustment times $t_1$-$t_Y$, where Y is an integer that may be equal to the number of samples m. The previous adjustment time $PA_{BS}$ identifies a time when an offset value $OS_{BS}$ was most recently determined by the BS 12. Each of the last adjustment times $t_1$-$t_Y$ may: be equal to the previous adjustment time $PA_{BS}$; and/or identify a time when the offset value $OS_{BS}$ was most recently determined relative to a corresponding one of the sample times $t_1$-$t_m$.

At 310, the BS difference module 254, the BS MAC 34 and/or the BS PHY 36 may determine which of the time differences $D_1$-$D_m$ for each of the samples satisfy a predetermined criterion. For example, the BS difference module 254, the BS MAC 34 and/or the BS PHY 36 may determine which of the time differences $D_1$-$D_m$ are less than or equal to the preselected amount of time T, which is defined above. The BS difference module 254, the BS MAC 34 and/or the BS PHY 36 may determine whether a current sample time t (one of the sample times $t_1$-$t_m$) satisfies one or more of equations 10-12.

$$t_Y - t \le T \quad (10)$$

$$PA_{BS} - t \le T \quad (11)$$

$$PRED_{BS} - t \le T \quad (12)$$

The time differences $D_1$-$D_m$ that satisfy equation 1 are represented as time differences $D_{Y1}$-$D_{Ym}$. The time differences $D_{Y1}$-$D_{Ym}$ are a subset of the time differences $D_1$-$D_m$.

At 312, the BS complex number module 260, the BS MAC 34 and/or the BS PHY 36 determines complex numbers $C_1$-$C_m$ based on the time differences $D_{Y1}$-$D_{Ym}$. The complex numbers $C_1$-$C_m$ may be represented by equation 13, where i is equal to $\sqrt{-1}$, and each one of the complex numbers $C_1$-$C_m$ has a real part (e.g., $\cos(D_{Y1})$) and an imaginary part (e.g., $i \cdot \sin(D_{Y01})$).

$$C_1, \ldots, C_m = \cos(D_{Y1}) + i \cdot \sin(D_{Y1}), \ldots, \cos(D_{Ym}) + i \cdot \sin(D_{Ym}) \quad (13)$$

At 314, the BS signal quality module 256, the BS MAC 34 and/or the BS PHY 36 determines signal strengths (or quality) values $S_1$-$S_n$ (referred to as weights) based on the pilot signal PilotCD. The signal quality values $S_1$-$S_n$ may be magnitudes that are equal to, proportional to, or determined as a function of SNRs, BERs, SIRs, or other signal quality characteristics of the pilot signal PilotCD. The BS signal quality module 256, the BS MAC 34 and/or the BS PHY 36 may determine the signal quality characteristics.

At 316, the BS weight module 258, the BS MAC 34 and/or the BS PHY 36 determines weighted values $W_1$-$W_m$ based on the complex numbers $C_1$-$C_m$ and the signal quality values $S_1$-$S_m$. The weighted values $W_1$-$W_m$ may be represented by equation 14 and/or 15.

$$W_1, \ldots, W_m = S_1 C_1, \ldots, S_m C_m \quad (14)$$

$$W_1, \ldots, W_m = S_1[\cos(D_{Y1}) + i \cdot \sin(D_{Y1})], \ldots, S_m[\cos(D_{Ym}) + i \cdot \sin(D_{Ym})] \quad (15)$$

Samples with a larger (or better) signal quality value may be weighted more (have a larger weight value) than samples with a smaller signal quality value.

At 318, the BS summation module 262, the BS MAC 34 and/or the BS PHY 36 determines a sum CS based on the weighted values $W_1$-$W_m$. The sum CS may be represented by equation 16 and/or 17.

$$CS = W_1 + W_2 + \ldots + W_m \quad (16)$$

$$CS = S_1[\cos(D_{Y1}) + i \cdot \sin(D_{Y1})] + \ldots + S_m[\cos(D_{Ym}) + i \cdot \sin(D_{Ym})] \quad (17)$$

When using equations 16 and 17, the cosine terms of the complex numbers may be summed to provide a cosine sum and the sine terms of the complex numbers may be summed to provide a sine sum. The sum CS may be equal to a sum of the cosine sum and the sine sum.

At 320, the BS offset module 264, the BS MAC 34 and/or the BS PHY 36 determines a propagation advance period or a propagation delay period, which may be referred to as an offset value $OS_{BS}$. The offset value $OS_{BS}$ may be determined using equation 18, where K is a constant, which may be a predetermined value and/or set by a control module of the BS 12.

$$OS_{BS} = K \cdot \arg(CS) \quad (18)$$

When using equation 18, the BS offset module 264, the BS MAC 34 and/or the BS PHY 36 sets the offset value $OS_{BS}$ equal to the constant K multiplied by an argument of the sum CS.

At 322, the BS time adjustment module 266, the BS MAC 34 and/or the BS PHY 36 determines the previous adjustment time $PA_{BS}$ or one of the last adjustment times $t_1$-$t_Y$. The BS time adjustment module 266, the BS MAC 34 and/or the BS PHY 36 may determine the times $PA_{BS}$, $t_1$-$t_Y$ based on the offset value $OS_{BS}$ and/or times when the offset value $OS_{BS}$ was last updated. The times $PA_{BS}$, $t_1$-$t_Y$ may be set equal to a time when the offset value $OS_{BS}$ was last updated. Each of the last adjustment times $t_1$-$t_Y$ may be set equal to a time when the offset value $OS_{BS}$ was last updated relative to a corresponding one of the sample times $t_1$-$t_m$.

At 324, the above determined parameters, such as the receive times $t_1$-$t_m$, the time differences $D_1$-$D_m$, time differences $D_{Y1}$-$D_{Ym}$, the complex numbers $C_1$-$C_m$, the signal quality values $S_1$-$S_m$, the weighted values $W_1$-$W_m$, the offset value $OS_{BS}$, the previous adjustment time $PA_{BS}$, and/or the last adjustment times $t_1$-$t_Y$ may be indicated in a data field of the compound signal $COMP_{BS}$, the data signal, and/or the pilot signal PilotBS and transmitted to the client device 14.

The BS 12 may also or alternatively send static symbols in each frame transmitted to the client device 14 to provide the client device with adjustment values(s) to adjust: the receiver activation and/or deactivation times of the client receiver 54; transmission times of the client transmitter 52;

and/or transmitter activation and/or deactivation times of the client transmitter 52. In this manner, the BS 12 may instruct the client device 14 to perform receiver and/or transmitter tuning. The BS tracking module 16 may compute the adjustment value(s) when a static symbol to be transmitted to the client device 14 is generated. Upon receiving packets with the adjustment amount(s), the client device 14 tunes the client receiver 54 and/or client transmitter 52 accordingly, as described below.

At 326, the client sampling module 106, the client receiver 54, the client MAC 46 and/or the client PHY 48 may receive the compound signal $COMP_{BS}$ and/or the static symbols. At 327, the client MAC 46 and/or the client PHY 48 may perform the method of FIG. 5 and/or the following tasks based on the parameters provided in the compound signal $COMP_{BS}$ and/or based on the static symbols. This may include determining an offset value (e.g., the offset value $OS_{CD}$ or $OS_{BS}$) based on the parameters provided at 326. The offset value may be determined as described above based on and/or as a function of: the parameters received from the BS 12 at the client device 14; times that packets of the compound signal $COMP_{BS}$ having the parameters and/or signal quality values arrive at the client device 14; a stored previous adjustment time PA (e.g., one of the previous adjustment times $PA_{CD}$, $PA_{BS}$); and/or the preselected amount of time T. The previous adjustment time PA may identify: a time when an offset value was most recently determined; a time when client receiver activation and/or deactivation times were last adjusted; a time when transmission timing and/or client transmitter activation and/or deactivation times were last adjusted. The previous adjustment time PA and the preselected amount of time T may be determined by the BS 12 and transmitted to the client device 14 or may be determined by and/or stored in the client device 14.

At 328, the client receiver timing module 122, the client MAC 46 and/or the client PHY 48 may generate the receiver signal REC to adjust receiver activation times and/or receiver deactivation times of the client receiver 54 based on one or more of the parameters provided in the compound signal $COMP_{BS}$ and/or based on the static symbols. The receiver signal REC may indicate the activation and/or deactivation times as the receiver timing values 223. The activation and/or deactivation times of the client receiver 54 may be delayed or advanced from current activation and/or deactivation times by an amount of the offset value determined at 327. This delays or advances periods and/or changes durations of the periods when the client receiver 54 is receiving signals from the BS 12. The receiver signal REC may be received by the client receiver 54, the client PHY 48, and/or a control module controlling power to the client receiver 54. The control module may be, for example, the client control module 44, a control module in the client MAC 46, the client PHY 48, or client receiver 54, or another control module.

At 330, the client transmitter timing module 272, the client MAC 46 and/or the client PHY 48 may generate a transmitter signal TRAN to adjust transmission times, an activation time and/or deactivation time of the client transmitter 52 based on one or more of the parameters provided in the compound signal $COMP_{BS}$. The transmitter signal TRAN may indicate the transmission times, transmitter activation time and/or transmitter deactivation time as transmitter timing values 331. The transmission times, activation times and/or deactivation times of the client transmitter 52 may be delayed or advanced from current respective times by an amount of the offset value determined at 327. This delays or advances periods and/or changes durations of the periods when the client transmitter is transmitting signals to the BS 12.

The adjustment in transmission times, activation times and/or deactivation times may be performed by the client transmitter 52 and/or client PHY 48, for example, during each frame, periodically, randomly, and/or every predetermined number of frames. The transmitter signal TRAN may be received by the client transmitter 52, the PHY 48, and/or a control module controlling power to the client transmitter 52. The control module may be, for example, the client control module 44, a control module in the client MAC 46, the client PHY 48, or client transmitter 52, or another control module.

At 332, the client time adjustment module 124, the client MAC 46 and/or the client PHY 48 determines the previous adjustment time $PA_{CD}$ or one of the last adjustment times $t_1$-$t_X$. The client time adjustment module 124, the client MAC 46 and/or the client PHY 48 may determine the times PA, $t_1$-$t_X$ based on the offset signal determined at 327, the receiver signal REC, the transmitter signal TRAN, and/or times when the offset value, the receiver signal REC and/or the transmitter signal TRAN were last updated. The times PA, $t_1$-$t_X$ may be set equal to a time when the offset value, the receiver signal REC and/or the transmitter signal TRAN were last updated. Each of the last adjustment times $t_1$-$t_X$ may be set equal to a time when the offset signal, the receive signal REC and/or the transmitter signal TRAN was last updated relative to a corresponding sample time $t_1$-$t_n$. This provides updated last adjustment times which may be used when determining subsequent time differences.

At 334, the BS MAC 34 and/or the BS PHY 36 may determine whether another signal is received from the client device 14. The method may end at 336 or return to task 306 when another signal is received, as shown.

The above-described tasks of FIGS. 5 and 6 are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

Further in the above described tasks of FIGS. 5 and 6, the client device 14 may request additional symbols (or time allocated for the client device 14 in each frame) and/or allocated time slots. The client device 14 may transmit the request to the BS 12 and receive a response signal from the BS 12 identifying the allocated symbols and/or time slots. The client device 14 may then, using the above techniques, determine the offset value $OS_{CD}$ based on parameters associated with samples of signals transmitted at times of the additional symbols and/or allocated time slots.

The techniques described herein account for propagation advances and/or delays to maximize signal strength. This may include providing an improved SNR, SIR, and/or BER. The techniques disclosed include tuning a client receiver and a client transmitter. Tuning the client receiver includes adjusting activation and deactivation timing of the receiver. Tuning the client transmitter includes adjusting transmission timing of the transmitter. This improves signal quality and reliability for signals transmitted between a client device and a BS.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method of tuning a receiver of a client device, the method comprising:
   receiving a pilot signal from a base station via the receiver of the client device;
   determining, via one of a physical layer device (PHY) and a medium access controller (MAC) of the client device, time differences and signal quality values for N samples of N respective packets in the pilot signal, where N is an integer greater than 1;
   determining a weighting of the signal quality values for the N samples, wherein the samples with a larger signal quality value are weighted more than the samples with a smaller signal quality value are weighted, and wherein the signal quality values have magnitudes of at least one from the group consisting of: signal-to-noise ratios and reduced bit error rates;
   determining, via one of the PHY and the MAC, an offset value based on the time differences and the weighted signal quality values; and
   adjusting, via the PHY and based on the offset value an activation time or a deactivation time of the receiver of the client device.

2. The computer-implemented method of claim 1, further comprising:
   sampling the pilot signal to determine receive times for the N samples via the receiver;
   determining, via one of the PHY and the MAC, the time differences between the receive times and respective predetermined times of the client device for each of the N samples;
   comparing each of the time differences to a preselected amount of time in one of the PHY and the MAC; and
   determining the signal quality values for each of the N samples using one of the PHY and the MAC based on the comparisons, wherein the signal quality values are determined signal strengths of the pilot signal.

3. The computer-implemented method of claim 1, further comprising:
   for each of the N samples, when the one of the time differences is less than or equal to a preselected amount of time, generating a complex number based on (i) one of the time differences, and (ii) one of the signal quality values; and
   determining the offset value based on the complex numbers.

4. The computer-implemented method of claim 3, further comprising:
   weighting the complex numbers with respective ones of the signal quality values;
   determining the offset value based on the weighted complex numbers;
   summing the complex numbers to generate a sum; and
   determining the offset value based on an argument of the sum.

5. The computer-implemented method of claim 1, further comprising:
   receiving a static symbol from the base station; and
   determining the offset value based on the static symbol.

6. The computer-implemented method of claim 1, further comprising receiving a compound signal from the base station, wherein:
   the compound signal includes a data signal and the pilot signal, wherein the data signal includes user data, and wherein the pilot signal is transmitted at a carrier frequency and modulated with respect to the data signal; and
   the compound signal is transmitted in television whitespace and is a time division multiplexed signal.

7. The computer-implemented method of claim 6, further comprising determining the offset value based on parameters, wherein:
   the parameters are determined by the base station; and
   the compound signal includes fields identifying the parameters.

8. The computer-implemented method of claim 1, further comprising:
   transmitting a request for additional symbols or allocated time slots from the client device to the base station; and
   determining the offset value based on parameters associated with samples of signals transmitted at times of the additional symbols or allocated time slots.

9. The computer-implemented method of claim 1, further comprising:
   comparing each of the time differences to a preselected amount of time in one of the PHY and the MAC;
   determining, via one of the PHY and the MAC, the offset value based on (i) the comparisons, (ii) the time differences, and (iii) the signal quality values; and
   adjusting, via the PHY and based on the offset value, at least one of the activation time and the deactivation time of the receiver of the client device.

10. A computer-implemented method of tuning a transmitter of a client device, the method comprising:
    transmitting a pilot signal from the client device to a base station via the transmitter of the client device;
    receiving time differences and signal quality values from the base station via the receiver of the client device, wherein the time differences and signal quality values are generated for M samples of M respective packets in the pilot signal at the base station, where M is an integer greater than 1;
    determining a weighting of the signal quality values for the N samples, wherein the samples with a larger signal quality value are weighted more than the samples with a smaller signal quality value are weighted, and wherein the signal quality values have magnitudes of at least one from the group consisting of: signal-to-noise ratios and reduced bit error rates;
    determining, via one of the PHY and the MAC, an offset value based on the time differences and the weighted signal quality values; and
    adjusting, via the PHY and based on the offset value, at least one of a transmission time, an activation time or a deactivation time of the transmitter of the client device.

11. The computer-implemented method of claim 10, further comprising:

generating the time differences based on arrival times of the M packets in the pilot signal at the base station and corresponding predetermined allocation times of the client device;

comparing each of the time differences to a preselected amount of time in one of the PHY and the MAC; and determining the signal quality values based on the comparisons, wherein the signal quality values are determined signal strengths of the pilot signal.

12. The computer-implemented method of claim 11, further comprising:

for each of the M samples, when the one of the time differences is less than or equal to a preselected amount of time, generating a complex number based on (i) one of the time differences, and (ii) one of the signal quality values; and determining the offset value based on the complex numbers.

13. The computer-implemented method of claim 12, further comprising:

weighting the complex numbers with respective ones of the signal quality values;

determining the offset value based on the weighted complex numbers summing the complex numbers to generate a sum; and determining the offset value based on an argument of the sum.

14. The computer-implemented method of claim 10, further comprising: receiving a static symbol from the base station; and determining the offset value based on the static symbol.

15. The computer-implemented method of claim 11, further comprising receiving a compound signal from the base station, wherein:

the compound signal includes a data signal and the pilot signal, wherein the data signal includes user data, and wherein the pilot signal is transmitted at a carrier frequency and modulated with respect to the data signal; and the compound signal is transmitted in television whitespace and is a time division multiplexed signal.

16. The computer-implemented method of claim 15, further comprising determining the offset value based on parameters, wherein:

the parameters are determined by the base station; and the compound signal includes fields identifying the parameters.

17. The computer-implemented method of claim 10, further comprising:

transmitting a request for additional symbols or allocated time slots from the client device to the base station; and determining the offset value based on parameters associated with samples of signals transmitted at times of the additional symbols or allocated time slots.

18. The computer-implemented method of claim 10, further comprising transmitting the pilot signal from the transmitter of the client device to the base station;

receiving parameters including the time differences and the signal quality values from the base station via the receiver of the client device;

determining the offset value based on the time differences and signal strengths of the pilot signal via one of the PHY and the MAC of the client device; and adjusting at least one of the activation time and the deactivation time of the receiver of the client device via the PHY based on the offset value.

19. The computer-implemented method of claim 10, further comprising:

transmitting the pilot signal from the transmitter of the client device to the base station;

receiving the time differences and the signal quality values from the base station via the receiver of the client device;

determining the offset value based on the time differences and the signal quality values via one of the PHY and the MAC of the client device; and adjusting transmission timing of the transmitter of the client device via the PHY based on the offset value.

* * * * *